H. A. W. HOWCOTT.
ROUND BALE COTTON PRESS.
APPLICATION FILED JUNE 25, 1920.
1,418,441.
Patented June 6, 1922.
4 SHEETS—SHEET 4.
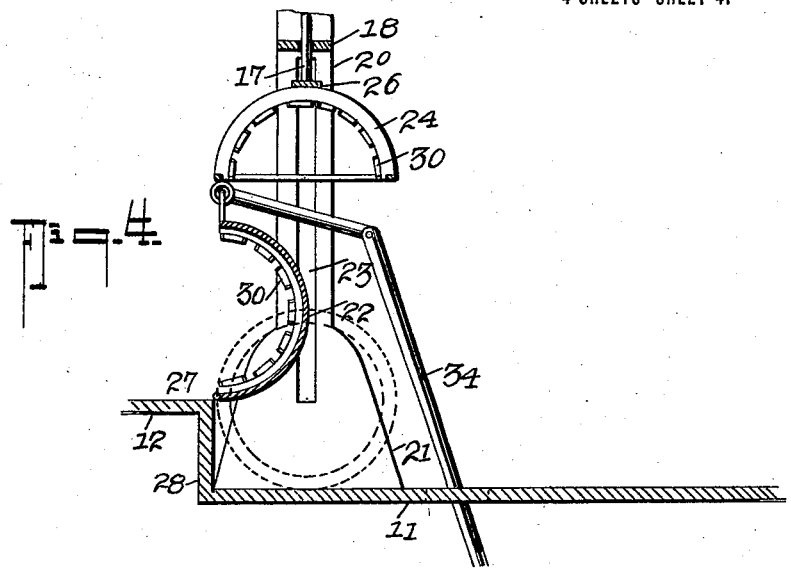
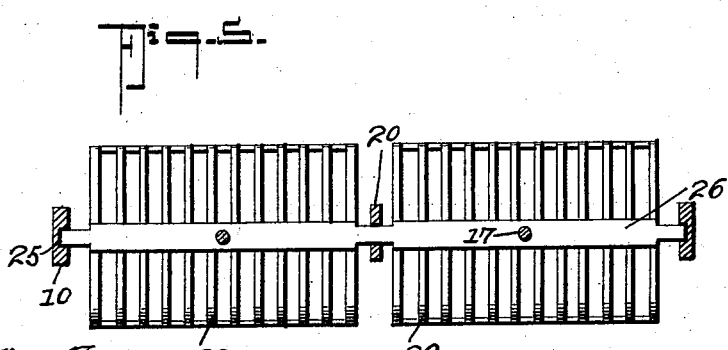
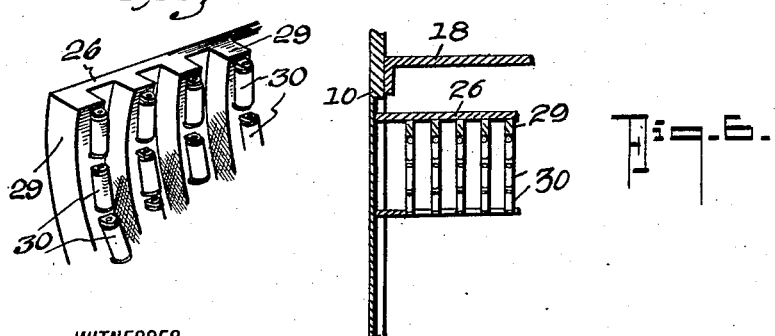
WITNESSES
INVENTOR
H. A. W. Howcott.
BY
ATTORNEYS

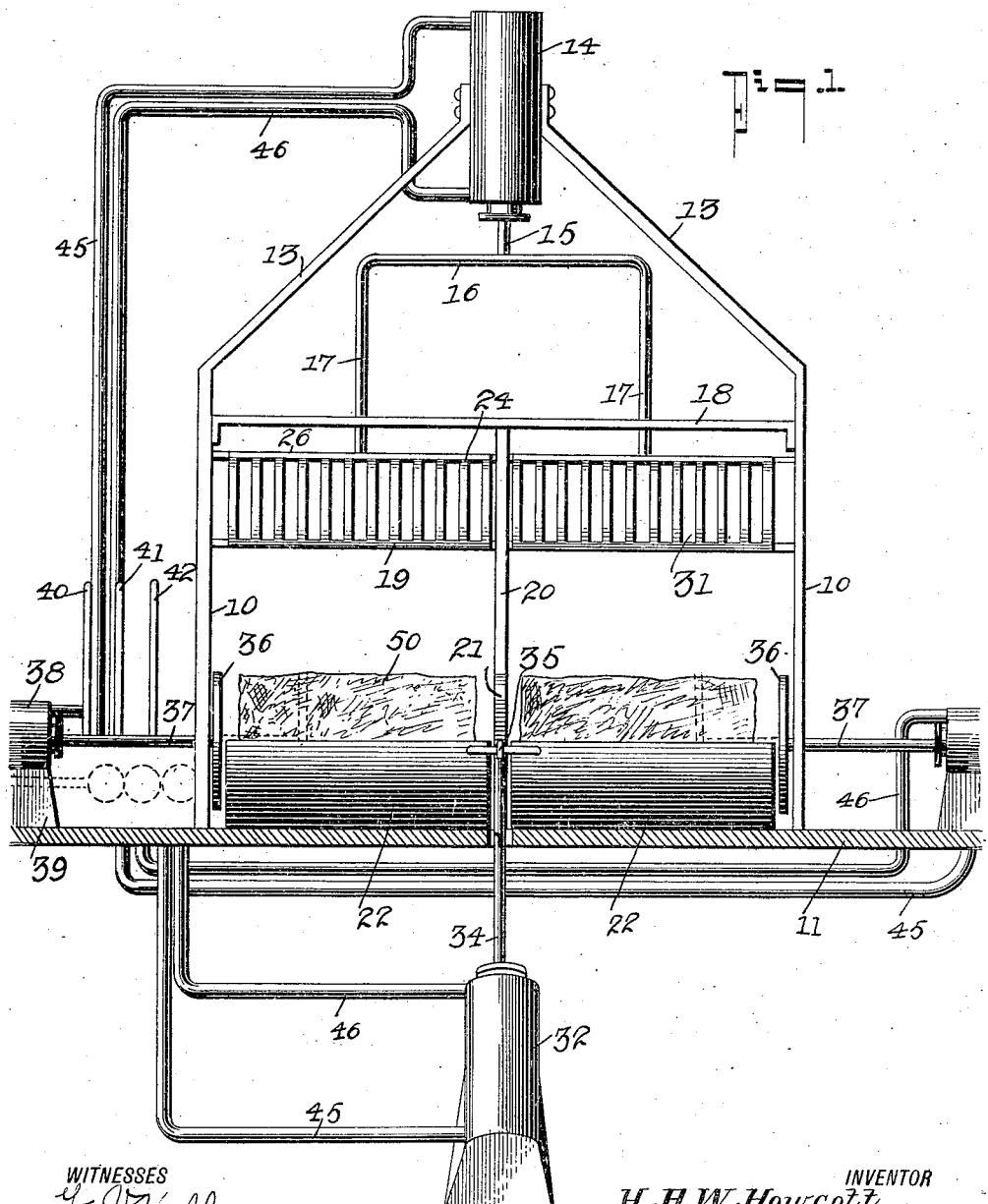

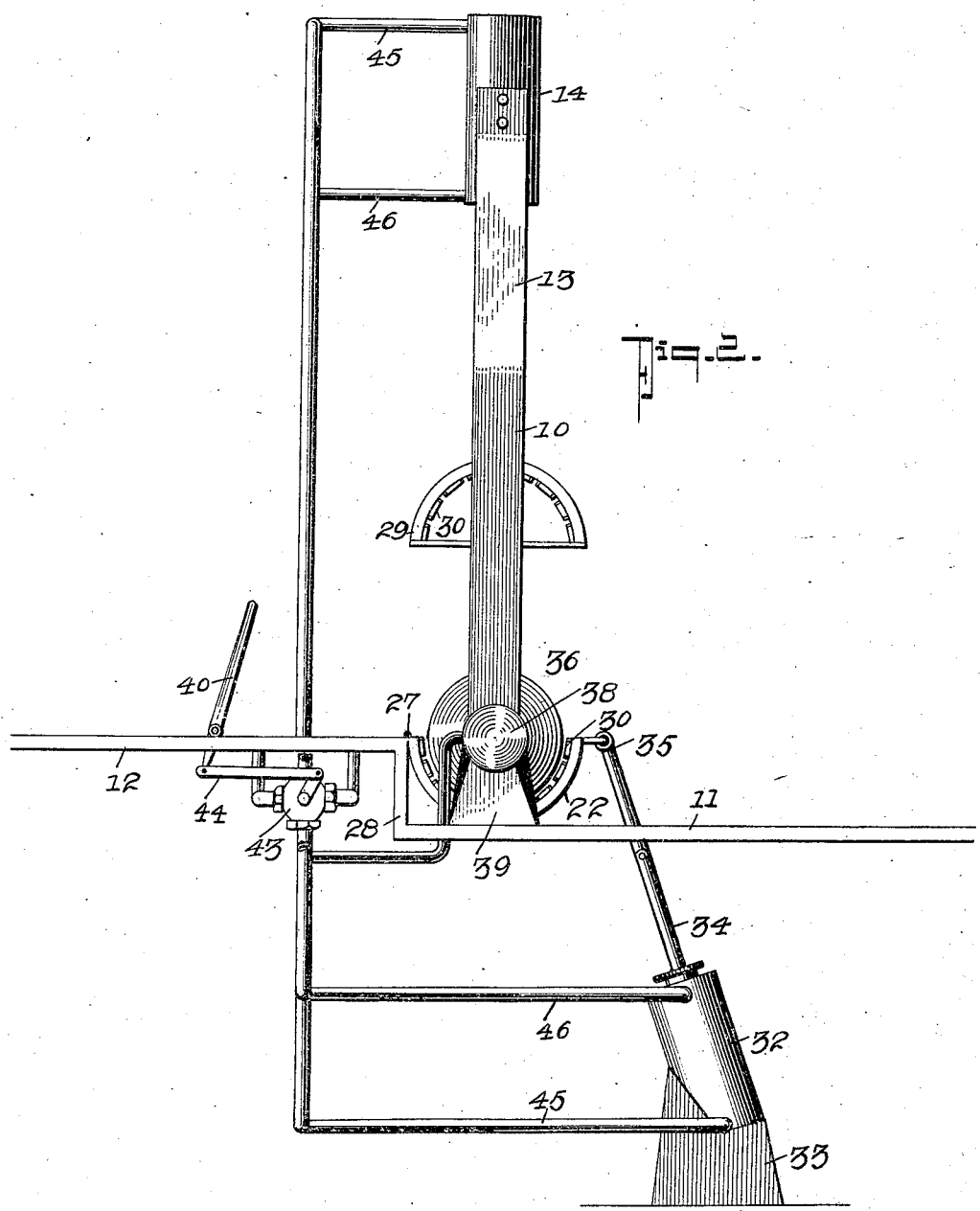

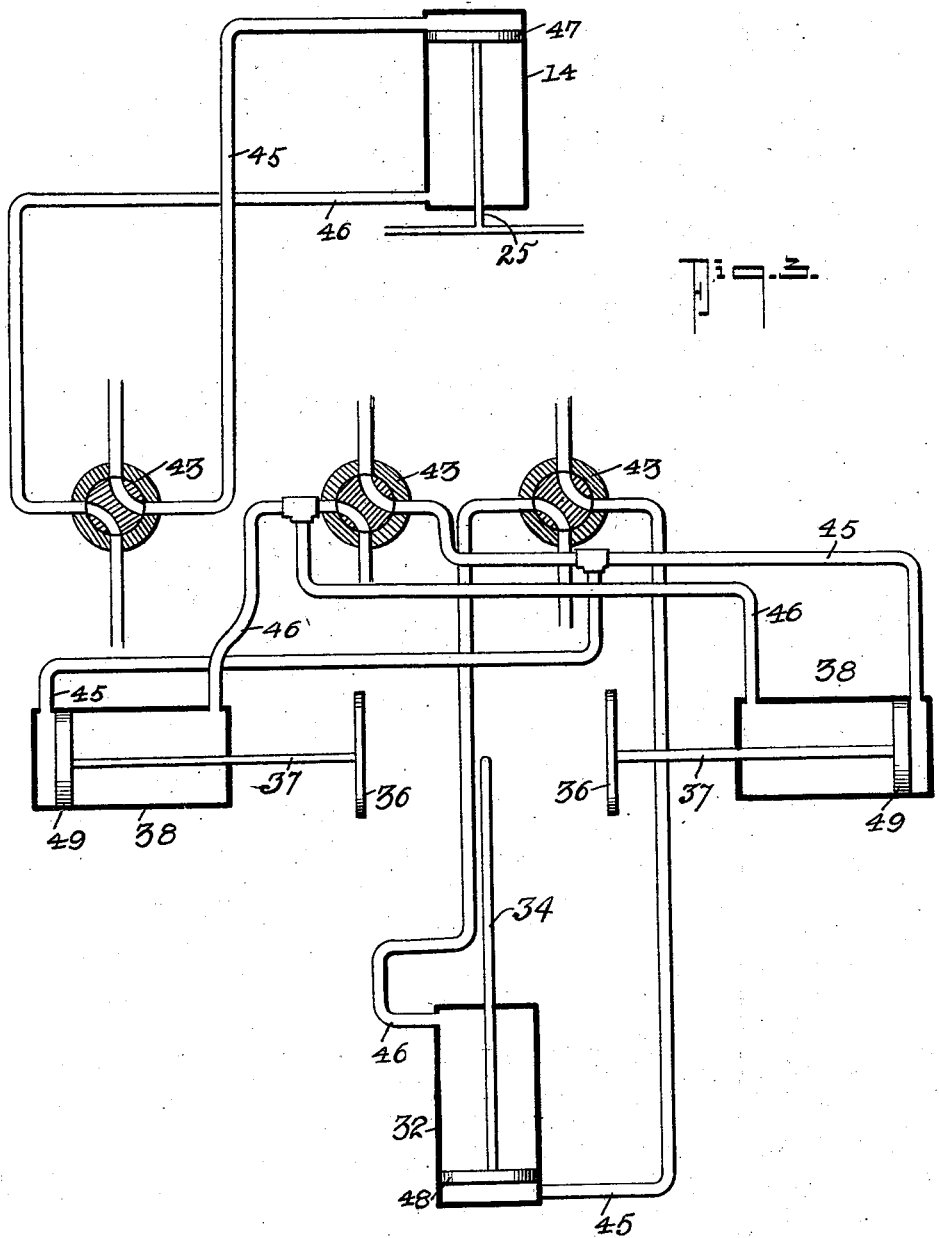

UNITED STATES PATENT OFFICE.

HARLEY ALEXANDER WATT HOWCOTT, OF NEW ORLEANS, LOUISIANA.

ROUND-BALE COTTON PRESS.

1,418,441.  Specification of Letters Patent.  Patented June 6, 1922.

Application filed June 25, 1920. Serial No. 391,566.

*To all whom it may concern:*

Be it known that I, HARLEY ALEXANDER WATT HOWCOTT, a citizen of the United States, and a resident of New Orleans, Orleans Parish, Louisiana, have invented certain new and useful Improvements in Round-Bale Cotton Presses, of which the following is a specification.

This invention has reference to presses, and more particularly to a round bale cotton press.

The object of the invention is to provide an improved cotton press which is adapted to receive the ordinary square or oblong bales of compressed cotton and to apply additional pressure laterally and longitudinally thereof for reducing the sizes of the bales and to cause the same to assume a cylindrical or round shape, as well as to facilitate tying of the same when held by the press in the shape mentioned.

A further object of the invention is to provide an improved press for the purposes stated, which is adapted to facilitate the application and discharge of the bales, and which renders the application of pressure by power, capable of convenient control so that the pressure may be applied or released by the operation of controlling levers, steam or other fluid pressure as in connection with hydraulic presses, being employed for this purpose.

A further object of the invention is to provide a novel form of press structure which is adapted to sustain the weight and pressure of the bales and mechanism of the device, while also permitting the necessary longitudinal or endwise compression of the bales and novel arrangement of conduits or pipes for controlling the application of pressure by a series of cylinder contained plungers, so that the pressure may be applied in proper sequence, and released, as well as serving to discharge the bales when compressed, and generally facilitating the compressing of square bales of cotton or the like into cylindrical shape as heretofore pointed out.

A still further object is to provide a strong and durable press construction by which great pressure may be applied to the bales for the purpose of pressing and shaping the same in the manner specified, and which besides being capable of being operated by a single engineer or operator, to cause the plungers to exert the compressing action and to discharge the bale, will be strong and durable and not likely to get out of working order.

Other and further objects of my invention will become readily apparent to persons skilled in the art from a consideration of the following description when taken in conjunction with the accompanying drawings, wherein:

Figure 1 is a front elevation of a round bale cotton press constructed in accordance with the invention, Figure 2 is a side view, Figure 3 is a diagrammatic sectional elevation showing the arrangement of the compressors, steam pipes and valves for controlling the operation of the device, Figure 4 is a fragmentary vertical sectional view showing the position of the parts when compressing a bale, Figure 5 is a horizontal sectional view of the device as shown in Figure 4, Figure 6 is a fragmentary vertical sectional view of one end of the press, and Figure 7 is a detailed view showing an anti-friction member or roller employed with the upper and lower press sections.

Referring to the drawings in detail, in which like reference characters indicate corresponding parts throughout the several views, my improved press is shown as embodying a frame or supporting structure including side members 10 which are arranged vertically upon a flooring 11 having a portion 12 thereof raised above the level of the portion 11 to facilitate the handling of the bales by the laborers, as will be hereinafter more fully specified. The side members 10 have their upper ends extending in opposite directions inwardly toward each other in inclined positions, as indicated at 13, so as to support a cylinder 14 in which is contained a fluid operated piston or plunger having a piston rod 15 extending downwardly and connected to a cross head 16, the shank portions 17 of which are adapted to operate through a cross bar 18 connecting the side portions 10 of the frame and have connection with the semi-cylindrical upper compressor sections 19 of the press. Suitable fluid power is provided for operating the piston and any number of the baling press sections may be provided as desired.

In the form shown, there are two of said presser sections which are separated by an intermediate vertical frame member 20 having a base or enlargement 21 at its lower end adapted to overlie or close the inner ends of the semi-cylindrical lower presser sections 22 which cooperate with the upper presser sections 19, in order to form chambers in which the bales are compressed. The vertical intermediate frame member 20 is provided with a vertical slot 23 through which a horizontal connection 24 at the top of the presser sections, is vertically slidable and guided in its movements, the cross member 18 being apertured to receive the shank portions 17 for movement therein vertically as the presser sections are reciprocated, the end members 10 being grooved as indicated at 25 to form guideways for the ends of the cross member 26 of the presser sections 19.

The presser sections 19 and 22 are of semicircular cross section, the former being adapted to reciprocate and the latter being mounted upon the floor 11 and hinged at 27 at the top of the vertical portion 28 connecting the upper and lower floor levels 11 and 12. The sections are adapted to cooperate to form a cylindrical chamber in each instance, two chambers being provided as shown and each of the sections being provided with a series of spaced parallel semicircular ribs 29 cooperating to form spaced annular ribs upon which are mounted alined series of anti-friction members or rollers 30 at right angles to the axis so as to permit free longitudinal or axial movement of the bales or material thereof when compressed lengthwise. The outer surface of each presser section 22 is smooth, solid walls being provided, while the sections 19 are open between the ribs to form grooves or slots 31 so that the bale ties when extended between the ribs of the lower sections of the cylinders or chambers formed by the presser sections 19 and 22, may be extended around the bales and fastened at the top when the bales have been compressed as desired.

As before mentioned, the presser sections 22 are pivoted or hinged at one edge of each, the purpose thereof being to permit the lower sections of the chambers to be raised for discharging the bales as particularly indicated in Figure 4 of the drawings. For this purpose, an inclined cylinder 32 is supported upon a suitable foundation beneath the floor line, as indicated at 33, and the piston thereof is provided with a piston rod 34 preferably formed in hinged sections or otherwise and connected to a U-shaped member or crank 35 fixed to the inner ends of the lower presser sections 22 so that both may be actuated simultaneously by the piston within the cylinder 32, the devices being power actuated and steam being preferably employed as a motive fluid. In this operation, the sections 22 will swing upwardly so that the open sides thereof will be positioned to discharge the bale on the upper floor level, the upper sections 19 having been previously raised to permit free passage of the lower sections and the articulated sections of the plunger moving to angular relation as clearly depicted in Figure 4. The means and mode of operation of the pistons will be later described.

The ends of the cylinders or chambers formed by the upper and lower presser sections 19 and 22 are open and adapted to receive circular presser plates or plungers 36 mounted at the inner ends of piston rods 37 which are operable through apertures in the side members 10 and which serve as guides for said piston rods, maintaining the same in true horizontal position. The piston rods 37 are connected to pistons 49 working in cylinders 38 mounted upon suitable foundations 39 upon the lower floor level 11 and simultaneously actuated and controlled so as to compress the bales lengthwise, as distinguished from the action of the sections 19 and 20, which serve to compress the square bales into circular cross section or cylindrical shape. For this purpose, the cylinders 38 are mounted in horizontal alinement across the apparatus or machines, the plungers being located axially of the chambers produced by the upper and lower sections 19 and 22 of the press and when the plungers 36 are in the position shown in Figure 1 of the drawings, they may be forced inwardly to the dotted line positions to compress the bales longitudinally and then drawn outwardly, in order that the bales may be discharged, the plungers when in dotted line positions serving to clear the lower sections of the press as well as the upper sections, in order to permit functioning thereof.

As a means for operating the compressing devices and controlling the operation thereof, fluid motive power is employed, preferably steam. For this purpose, there is provided an opening in the upper floor level through which a plurality, preferably three levers 40, 41 and 42 are pivoted and are operable, the same being each connected with a control valve 43 as through the medium of a connecting rod 44, in order that the fluid pressure, such as steam, may be alternately discharged into the respective cylinders through independent pipes 45 and 46 at the outer and inner ends thereof, so that when steam is being supplied to force the respective piston inwardly, the opposite end is connected as an exhaust. The pistons 47 and 48 are designed for independent actuation, while the pistons 49 in the cylinders 38 are adapted for simultaneous actuation, so that in the operation of the device, the bales indicated at 50 are placed in the lower sections 22 of the press chambers, said bales being the ordinary cotton bales or the like of rectangular or square cross section which have been previously subjected to the action of a press on the plantation and then sent to the mill for further compression. This being done, the valve 43 controlled by the lever 40 is opened in order to cause the upper sections 19 to move downwardly, thus compressing the bales into circular cross section. While the valve 43 controlled by the lever 40 is held in this position, the lever 41 is actuated to open its corresponding valve, whereby steam is admitted into the cylinders 38 to force the plungers 36 inwardly in opposite directions against the bale, thus compressing the latter longitudinally. During this operation, the rollers 30 will facilitate movement of the material without undue friction and the ties having been previously applied between the ribs of the lower sections 22 may be extended between the ribs of the upper sections and the ends thereof connected, in order to hold the bales in shape. The levers 41 and 40 are then subsequently reversed in the order mentioned preferably, so as to release the plungers 36 from the ends of the bales, the inner ends of which are compressed against the vertical member 20 of the frame structure, while also raising or elevating the upper sections 19 as the piston 47 moves upwardly, as distinguished from the downward movement when on its forward stroke to compress the bales. The pistons 49 will move outwardly, in releasing the bales, as distinguished from the inward movement thereof in compressing the bales and then the lever 42 is actuated to open the corresponding valve, in order that the piston 48 will be forced upwardly or outwardly, in order that the lower sections of the compressor will be swung on hinge connections or pivots 27 to discharge the bales, as will be clearly understood from an inspection of Figure 4 of the drawings. When the bales have been discharged, the valve of the lever 42 is operated in the opposite direction, thus admitting the motive fluid or steam to the upper end of the cylinder 32, so as to force the piston 48 downwardly, returning the sections 22 to their initial positions as shown in Figures 1 and 2 of the drawings. The device is then in position for compressing other bales into cylindrical shape, in which they will be more compact, can be more conveniently handled, and will occupy less space in storage or when being shipped. Of course, it is to be understood that the bundles are fastened with ties or the like in the usual manner.

Having thus described my invention, what I claim is:—

1. A press for shaping bales of cotton or the like from rectangular shape or square cross section into cylindrical shape or round cross section, comprising opposed semi-cylindrical presser sections, and means for actuating the same, one section being slidable and the other pivoted to move to pressing or dumping positions.

2. A press for shaping bales of cotton or the like from rectangular shape or square cross section into cylindrical shape or round cross section, comprising opposed semi-cylindrical presser sections, one of said sections being adapted to move vertically against the other for compressing the bale therebetween, and the other section being pivoted at one edge at one level and movable to a lower level or to a raised position, to receive and dump the bale.

3. A press for shaping bales of cotton or the like from rectangular shape or square cross section into cylindrical shape or round cross section, comprising opposed semi-cylindrical presser sections, one of said sections being provided with a solid wall having interior circumscribing ribs forming spaced grooves, and the other section having similar ribs alined with the first-named ribs and providing spaced slots for receiving bale-fastening ties in conjunction with said grooves.

4. A press for shaping bales of cotton or the like from rectangular shape or square cross section into cylindrical shape or round cross section, comprising opposed semi-cylindrical presser sections, said sections being provided with alined spaced parallel ribs, anti-friction means mounted on said ribs, and compressing means acting at the ends of said sections.

5. A press for shaping bales of cotton or the like from rectangular shape or square cross section into cylindrical shape or round cross section, comprising opposed semi-cylindrical presser sections, compressing means acting at the ends of said sections to compress the bale lengthwise, means for actuating one of the opposed sections, and means for moving the other of the opposed sections to receiving and dumping positions as desired.

6. A press for shaping bales of cotton or the like from rectangular shape or square cross section into cylindrical shape or round cross section, comprising opposed semi-cylindrical presser sections, compressing means acting at the ends of said sections to compress the bale lengthwise, means for moving one of the opposed sections into and out of compressing position, said sections being arranged in spaced pairs and open at their outer ends, a division wall between said pairs of sections, anti-friction rollers mounted within said sections to permit free longitudinal compression, and means whereby the lower sections may be simultaneously swung to dumping position or returned to receiving position.

7. In a press of the class described, a supporting frame having a cross member, power operated presser sections movable therein, power operated plungers at the sides of the frame, and dumpable presser sections cooperating with the first named sections and adapted to receive said plungers, said dumpable sections being power operated.

8. In a press of the class described, a supporting frame, reciprocable power operated presser sections movable therein, oppositely reciprocable power operated plungers at the sides of the frame, dumpable presser sections cooperating with the first named sections and adapted to receive said plungers in one position, said dumpable sections being power operated, conduits controlling said actuating means for the sections, and controlling means for said actuating means.

9. A press of the class described comprising the combination with a supporting surface arranged at higher and lower levels, of a frame supported upon the lower level and having side members and a vertical intermediate division member, a cross member at the top of the intermediate member, power plungers acting within said sides in opposite directions, upper and lower compressor sections, power actuated means having plungers operable through said cross member for said upper sections, power operated means for tilting said lower sections, and conduits connected with said power operated means and having valves for controlling the same, and means for actuating said valves, one of said valves serving to simultaneously control said plungers.

10. A press of the class described comprising lower semi-cylindrical sections, upper semi-cylindrical sections cooperating therewith, means for raising and lowering the upper sections, and anti-friction means arranged within said sections to facilitate longitudinal compression of the bales therein.

11. A press of the class described comprising lower semi-cylindrical sections, upper semi-cylindrical sections cooperating therewith, means for raising and lowering the upper section, compressing means for the ends of said sections, inclined power operated means for tilting the lower sections, and means for independently controlling the upper and lower sections and simultaneously controlling said plungers.

12. A press for shaping bales of cotton or the like, from rectangular or square cross section into cylindrical shape or round cross section, comprising a vertical frame having side portions, a power cylinder supported between said side portions and the top of the frame, a cross member on the frame, a plunger in the cylinder having a crosshead and shank portions operating through said cross member, a hinged pair of lower sections adapted for movement to dumping and receiving positions, an inclined power cylinder having articulated connection with said lower sections for tilting the same, power operated plungers operable through the sides of said frame, a vertical central member in the frame against which the inner ends of the bales in the sections are adapted to be compressed, said section being provided with spaced groove forming ribs at the inside, anti-friction means arranged on said ribs to permit longitudinal compression of the bales, power cylinders controlling said plungers, conduits with a source of motive fluid, and manually operable valves inserted in said conduits for controlling the same.

13. In a press of the class described, a supporting frame, reciprocable presser sections movable therein, oppositely reciprocable plungers at the sides of the frame, dumpable presser sections cooperating with the first named sections and adapted to receive said plungers in one position, and operating and controlling means for said plungers and sections.

HARLEY ALEXANDER WATT HOWCOTT.